(12) United States Patent
Stamen et al.

(10) Patent No.: US 9,898,549 B1
(45) Date of Patent: *Feb. 20, 2018

(54) TENANT-AWARE DATABASE FOR SOFTWARE AS A SERVICE

(71) Applicant: Progress Software Corporation, Bedford, MA (US)

(72) Inventors: Jeffrey Stamen, Weston, MA (US); Gustav H Bjorklund, Chelmsford, MA (US)

(73) Assignee: Progress Software Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,407

(22) Filed: Jun. 11, 2015

Related U.S. Application Data

(63) Continuation of application No. 12/117,238, filed on May 8, 2008, now Pat. No. 9,081,805.

(Continued)

(51) Int. Cl.
| | | |
|---|---|---|
| *G06F 7/00* | (2006.01) | |
| *G06F 17/30* | (2006.01) | |
| *G06F 9/50* | (2006.01) | |

(52) U.S. Cl.
CPC ...... *G06F 17/30917* (2013.01); *G06F 9/5016* (2013.01); *G06F 9/5027* (2013.01);
(Continued)

(58) Field of Classification Search
CPC ......... G06F 17/30297; G06F 17/30312; G06F 21/602; G06F 9/5016; G06F 9/5027
See application file for complete search history.

(56) References Cited

U.S. PATENT DOCUMENTS 5,940,835 A * 8/1999 Sit .................... G06F 17/30952
7,260,304 B1 * 8/2007 Harradine ............ G11B 27/002
375/E7.004

(Continued)

*Primary Examiner* — Marc Somers
(74) *Attorney, Agent, or Firm* — Patent Law Works LLP

(57) ABSTRACT

A system for providing a tenant-aware database includes a relational database management system comprising a query engine, a transaction manager, a buffer manager, a recovery manager and a storage manager. The storage manager includes a tenant table, a tenant/user table, a tenant/object table, a multi-tenant table structure and multi-tenant index structure. The tenant table, the tenant/user table, the tenant/object table, the multi-tenant table structure and the multi-tenant index structure cooperate to provide a mechanism that has a single schema definition with multiple data instances for tables and their associated indexes, one for each tenant. The use of multi-tenant structures and associated components in the storage manager is advantageous because it provides: good isolation among tenant's data (each tenant's data can be stored in one or multiple storage areas independent of other tenants), simple schema updates as there is only one schema to update, easy maintenance that can be done for individuals tenant's data without affecting others, good performance and good scalability. The present invention also includes a variety of methods including: a method for reading or writing using the storage manager, a method for reading or writing using the multi-tenant table structure and the multi-tenant index structure, a method for determining the tenant of a user and a method for making multi-tenant schema changes.

20 Claims, 12 Drawing Sheets

Related U.S. Application Data

(60) Provisional application No. 60/916,758, filed on May 8, 2007.

(52) U.S. Cl.
CPC .. *G06F 17/30297* (2013.01); *G06F 17/30595* (2013.01); *G06F 17/30864* (2013.01)

(56) References Cited

U.S. PATENT DOCUMENTS

| | | | |
|---|---|---|---|
| 7,680,825 B2 * | 3/2010 | Becker | G06F 17/3089 707/999.107 |
| 2003/0187908 A1 * | 10/2003 | Boucher | G06F 9/5055 718/103 |
| 2006/0100912 A1 * | 5/2006 | Kumar | G06F 17/30864 705/4 |
| 2006/0136471 A1 * | 6/2006 | Ge | G06F 17/30297 |
| 2007/0088741 A1 * | 4/2007 | Brooks | G06F 8/68 |
| 2008/0162483 A1 * | 7/2008 | Becker | G06F 17/30575 707/9 |
| 2008/0243867 A1 * | 10/2008 | Janedittakarn | G06F 17/30424 |

* cited by examiner

TENANT-AWARE DATABASE FOR SOFTWARE AS A SERVICE

CROSS REFERENCE TO RELATED APPLICATIONS

This application claims priority under 35 U.S.C. § 120 to U.S. patent application Ser. No. 12/117,238, titled "Tenant-Aware Database for Software As A Service," filed May 8, 2008, which claims priority under 35 U.S.C. § 119(e) to U.S. Provisional Patent Application No. 60/916,758, titled "Multi-Tenant Relational Database For Software As A Service (SaaS)," filed May 8, 2007. The entire contents of the foregoing are incorporated by reference herein.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

BACKGROUND OF THE INVENTION

1. Field of the Invention

The present invention relates to the field of database management systems in general, and specifically, to the use of database management systems to support software applications offered in Software as a Service (SaaS) environments.

2. Description of the Background Art

In recent years, new models for computing and the delivery of software have developed. One such model is commonly referred to Software as a Service (SaaS). In SaaS, an application provider (or software vendor) develops a software application and hosts and operates the application for use by its customers over a network such as the Internet. Each customer (or tenant) perceives that they have a dedicated application and database just for them and their users, but in reality the same application and database can serve multiple tenants concurrently and isolate one tenant and their data from another. A tenant is a company or organization which contracts with an application provider to use the application provider's SaaS-enabled application. The tenant is the application provider's customer.

Typically, the tenants of the application do not install the application on their own computer equipment. Instead, the tenants buy a service or subscription from the application provider, and the tenants access the application remotely, often by means of a web browser or so called "thin-client' interface. The application executes on a computer system which is typically deployed at a location separate from the tenant's premises or place of business such as the facility of the application provider or a third party hosting facility. In addition, one or more application components may be hosted at the tenant's premises to enable data extant at the tenant's equipment to be integrated with and accessed by the remotely hosted application. The tenant's multiple users access the application from one or more remote locations. The application provider typically provides this service to many different tenants at the same time. Use of the application is frequently offered under terms such as a monthly or weekly rental or at a fee based on the number of transactions or other operations executed rather than a perpetual license. When several or many tenants use the same application and associated database at the same time without being aware of each other, this arrangement is called multi-tenancy.

A problem with the existing art is that database systems are not designed to support storing data for multiple tenants in a single database. The prior art has attempted to solve this problem using a number of different data architectures for SaaS data storage. For example, a first approach is to use a separate database for each tenant. In this architecture, there is a separate database and database server for each tenant. All tenants can use the same application instance or customized versions. However, this is architecture suffers from a number of disadvantages including poor scalability, higher system resource and infrastructure requirements, inefficiency when the number of users per tenant is low, difficulty provisioning new tenants, and higher maintenance and administration costs (databases have to be backed up separately, schema's have to be kept in sync, and multiple servers have to be configured, monitored, started and stopped).

A second prior art approach uses a single shared database with separate schema and tables for each tenant. All tenants can use the same application instance or a customized version. The problem with this approach is that it is difficult to keep the separate schemas in synchronized. Also, it is more difficult to back up and restore an individual tenant's data.

A third prior art approach is a single shared database with shared schema and shared tables for all tenants. Each row and index entry of each table has an additional non-unique key component that is a tenant identifier. All tenants use the same application instance. However, this third prior art approach also has a number of problems including: invasiveness to applications due to the new column required in every table, low security due to mixing of tenant data in tables and indexes, poor query performance due to the need to include a tenant identifier in every query and an increase in the required number of input/output operations, caused by a reduction in locality-of-reference because rows of a table may be physically intermixed among tenants, complexity of maintenance and archiving of an individual tenant's data, one tenant more likely to affect performance of another due to high coupling among tenants data and queries, lower reliability since an application error or index corruption can affect all tenants data, and lower availability since maintenance operations such as rebuilding an index affects all tenants.

SUMMARY OF THE INVENTION

The present invention overcomes the deficiencies and limitations of the prior art by providing a system and method for providing a tenant-aware database. In one embodiment, the system is a relational database management system coupled to a database. The relational database management system comprises a query engine, a transaction manager, a buffer manager, a recovery manager and a storage manager. The storage manager is coupled to the buffer manager and the database, and controls the storage of data in the database and the retrieval of data from the database. The storage manager advantageously includes a tenant table, a tenant/user table, a tenant/object table, multi-tenant table structures multi-tenant index structures and potentially other multi-tenant structures (e.g. sequence generators). The tenant table, a tenant/user table, a tenant/object table, a multi-tenant table structure and multi-tenant index structure cooperate to provide a mechanism that has a single schema definition with multiple data instances, one for each tenant. This allows a single database to service a number of tenants without the disadvantages of the prior art noted above. Moreover, the use of multi-tenant structures and associated components in the storage manager is advantageous because it provides: good isolation among tenant's data (each tenant's data can be stored in one or multiple storage areas or tablespaces independent of other tenants), simple schema updates as there is only one schema to update, easy maintenance that can be done for individual tenant's data without affecting others, good performance and good scalability.

The present invention also includes a variety of methods including: a method for reading or writing data using the storage manager, a method for reading or writing using the multi-tenant table structure and the multi-tenant index structure, a method for determining the tenant of a user and a method for making multi-tenant schema changes.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
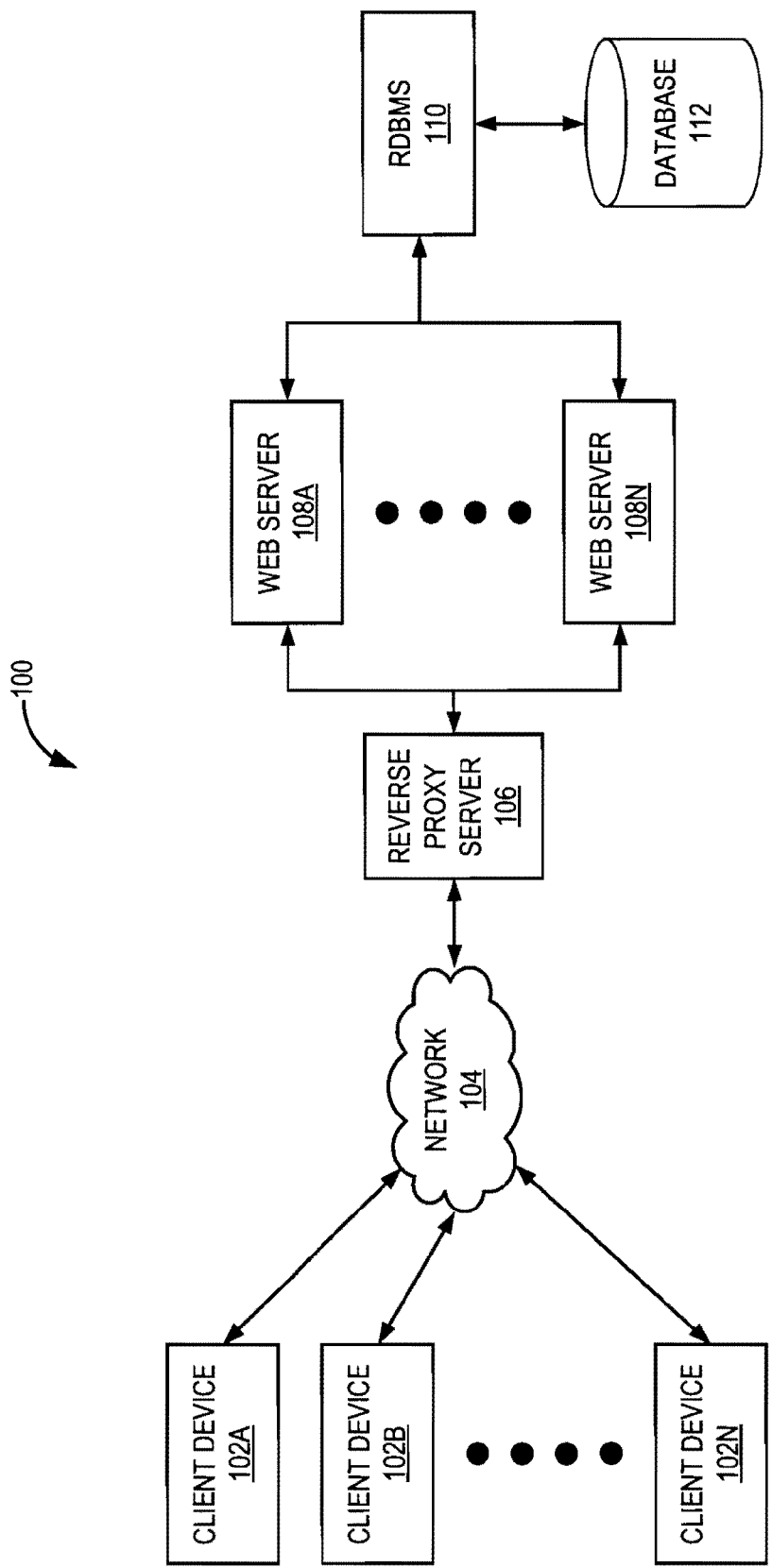
FIG. 1 is a high-level block diagram illustrating a distributed computing system including one embodiment of the present invention.

A tenant-aware database and method of use are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described below as part of a relational database management system; however, those skilled in the art will recognize that the present invention may be implemented in other database architectures.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

The present invention also relates to the persistent storage of data in a database or data storage devices. The data storage device may any suitable non-volatile mass storage device capable of persistently storing data such as but not limited to hard disk drives, optical storage devices, a flash memory devices, magnetic storage devices, etc.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a distributed computing system 100 including the present invention. The distributed computing system 100 includes a plurality of client devices 102A-102N, a network 104, a reverse proxy server 106, a plurality of web servers 108A-108N, a relational database management system (RDBMS) 110 and a database 112. These devices are coupled as shown in FIG. 1 to provide a SaaS environment in which users interact with the client devices 102A to access applications that operate on the web servers 108A-N and access the database 112 using the RDBMS 110. Each of these devices and their couplings is described in more detail below. FIG. 1 is used to illustrate one example context in which the present invention may be operational. Those skilled in the art will recognize that the present invention may operate in other contexts with additional or fewer devices and functionality than shown in FIG. 1.

The plurality of client devices 102A-102N are each a computing device and software operational on the computing device. For example, the client device 102A is a personal computer and a browser. In another embodiment, the client device 102A is a smart phone, a personal digital assistant, or any other type of computer. The client devices 102A-102N are coupled to the network 104 in a conventional manner. Although a plurality of client devices 102A-102N are shown in a minimal environment, there need only be one.

The network 104 may comprise a conventional network such as a local area network (LAN), a wide area network (WAN), the Internet or other suitable communication system wired or wireless. The network 104 couples the plurality of client devices 102A-102N to the reverse proxy server 106.

The reverse proxy server 106 is a proxy server that is installed within the neighborhood of one or more servers, typically in front of web servers 108A-108N. The connections coming from the network 104 (e.g., Internet) addressed to one of the web servers 108A-108N are routed through the reverse proxy server 106, which may either deal with the request itself or pass the request wholly or partially to the web servers 108A-108N. The reverse proxy server 106 is often used to provide an additional layer of security or defense by separating or masquerading the type of server that is behind the reverse proxy server 106. The reverse proxy server 106 is coupled to the network 104 and the plurality of web servers 108A.

A plurality of web servers 108A-108N are coupled to the reverse proxy server 106. In one embodiment, the web servers 108A-108N are a computer and software that provides the web service functionality. For example, the web servers 108A-108N include a computer program that is responsible for accepting requests from clients, such as web browsers, and serving them responses along with optional data contents, which usually are web pages such as HTML documents and linked objects (images, etc.). The web servers 108A-108N may be any one of a number of conventional types of web servers 108A-108N. In one embodiment, the web servers 108A-108N may also run other applications for example, although not shown, the web servers 108A-108N may includes programs and routines like that of an application server to handle business logic and data access. The web servers 108A-108N are coupled to the RDBMS 110.

The RDBMS 110 is a complex set of modules or software programs that controls the organization, storage, management and retrieval of data in the database 112. The RDBMS 110 is coupled to web servers 108A-108N and to the database 112. The RDBMS 110 is a system used to create, update and administer a relational database 112. The RDBMS 110 is described in more detail below with reference to FIG. 2.

The database 112 is coupled to the RDBMS 110 and is any conventional type of database for storing data and cooperating with the RDBMS 110. In one embodiment, the database 112 includes one or more conventional direct access storage devices. The database 112 is a structured collection of records or data that is stored.

Relational Database Management System (RDBMS)

Figure 2:
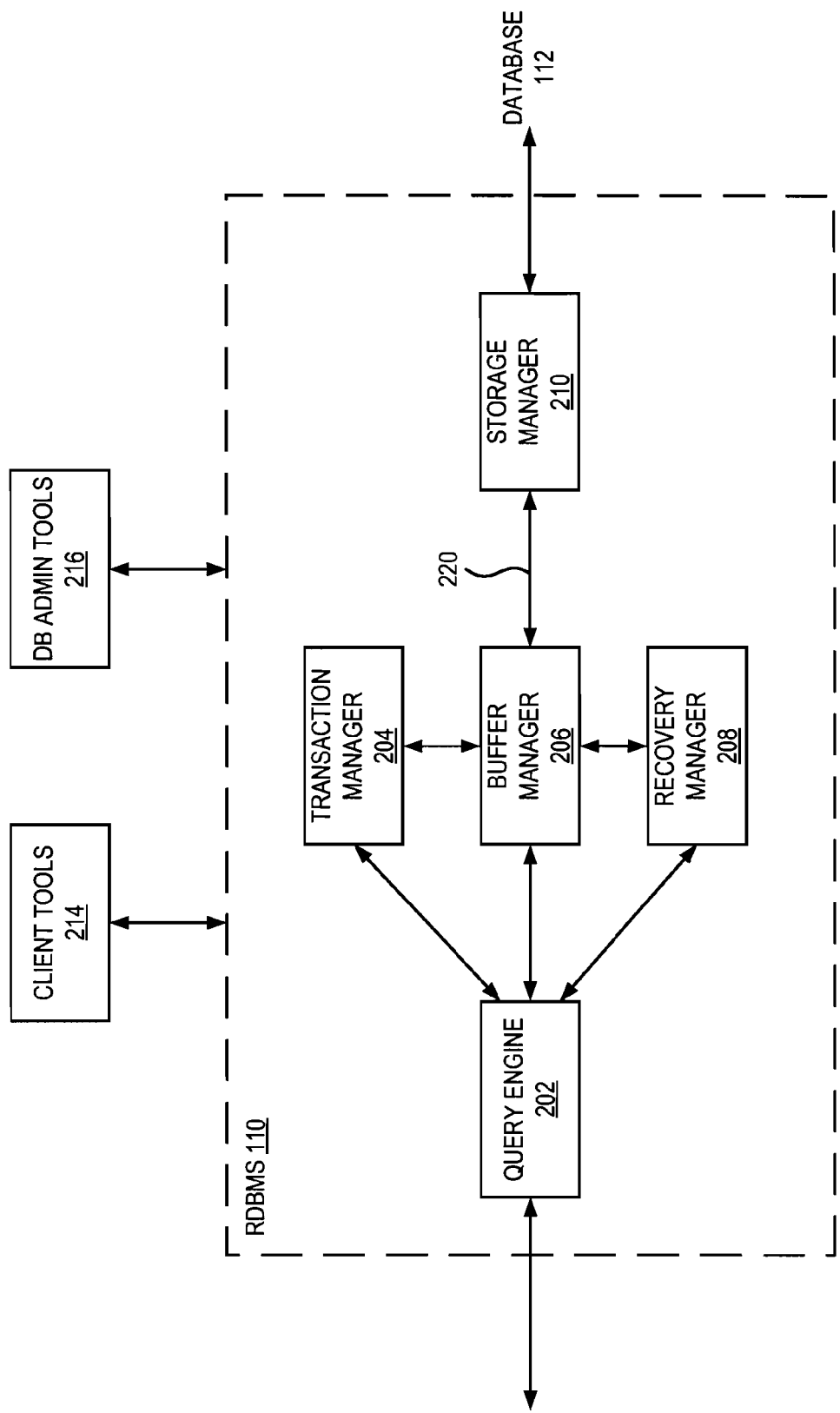
FIG. 2 is a high-level block diagram illustrating a relational database management system (RDBMS) including one embodiment of the present invention.

Referring now to FIG. 2, the RDBMS 110 according to one embodiment of the present invention is described. The RDBMS 110 is a complex set of software programs or modules that controls the organization, storage, management and retrieval of data in the database 112. In one embodiment, the RDBMS 110 comprises a query engine 202, a transaction manager 204, a buffer manager 206, a recovery manager 208 and a storage manager 210.

The query engine 202 is coupled to the web servers 108A-108N. The query engine 202 receives commands from the web servers 108A-108N, parses and optimizes the commands and creates a plan for execution of them. The query engine 202 is also adapted for communication with the transaction manager 204, the buffer manager 206 and the recovery manager 208. The query engine 202 uses the buffer manager 206 to read or write data to satisfy a user query. The query engine 202 also responds to the commands from the web servers 108A-108N with responses from the buffer manager 206. The query engine 202 also interacts with the transaction manager 204 to manage transactions and control concurrency. In one embodiment, the query engine 202 includes a parser, an optimizer and an executor. The parser checks the syntax of commands (e.g., SQL commands or any other query languages such as OQL), checks the existence of requested tables and columns, and checks user privileges to perform the operation. The optimizer checks the existence of suitable indexes and availability of other access paths such as a table-scan, which it may use to satisfy the query, chooses among several alternate ways to execute the command and prepares an optimal plan of execution. The executor takes the actions required to execute the plan or requests other components of the system to take necessary actions.

The transaction manager 204 is adapted for communication with the query engine 202 and the buffer manager 206. Although not shown, the transaction manager 204 may also be adapted for communication with the recovery manager 208. The transaction manager 204 facilitates transactions and concurrency. The transaction manager 204 allows the users to manipulate data atomically and concurrency ensures multiple concurrent users can access the data in a consistent way. The transaction manager 204 interacts with the buffer manager 206 to store copies of modified data temporarily for the lifetime of a transaction. The transaction manager 204 may include a lock manager that places locks on tables or records in a table being the modified as requested by transaction manager 204 or the user directly. The transaction manager 204 interacts with the recovery manager 208 to log modifications made in the data.

The buffer manager 206 is adapted for communication with the query engine 202 and the storage manager 210. The buffer manager 206 is responsible for memory management and interacts with the storage manager 210 to store or retrieve data to or from the database 112 (e.g., file system). The buffer manager 206 performs caching of data for fast retrieval and supplies the requested data to the query engine 202. The buffer manager 206 also performs the necessary replacement of data to and from the storage manager 210. In one embodiment, the buffer manager 206 maintains a data buffer for table and index structures, a metadata buffer for system catalog information and redo buffer for the log files. The buffer manager 206 may also include an undo buffer storing copies of data currently being modified by active transactions for the transaction manager 204.

The recovery manager 208 is adapted for communication with the query engine 202 and the buffer manager 206. The recovery manager 208 maintains copies of data and record changes made to the data so that in the event of a hardware or software induced system failure (i.e. a "crash"), the database 112 can be restored to a consistent state with a point of time just before the crash occurred. The recovery manager 208 uses the storage manager 210 to store backup data in the database 112. The recovery manager 208 uses the buffer manager 206 to re-apply the modifications while recovering the data during crash recovery, and uses the transaction manager 204 to recover from any active transactions that may have been ongoing at the time of the crash. In one embodiment, the recovery manager 208 includes a logger and backup & recovery component. The logger records any modifications made to the database 112 in log files. Using the backup & recovery component, an administrator can save copies of the data files and later use them in conjunction with log files to restore the database 112 in a consistent state at the point of time just before the crash happened.

The storage manager 210 has an input and output and is responsible for retrieving information from and storing information to the database 112. In particular, the storage manager 210 handles the persistent and efficient storage and retrieval of data in the database 112. The storage manager 210 is coupled to the buffer manager 206 by signal line 220. The storage manager 210 is also coupled to the database 112. The functionality and the operation of the storage manager 210 are described in more detail below with reference to FIG. 3.

As shown the RDBMS 110 is coupled to client tools 214 and database administration tools 216 for direct interaction and maintenance of the RDBMS 110. These client tools 214 and database administration tools 216 may be of conventional type provided in conjunction with the RDBMS 110.

Storage Manager

Figure 3:
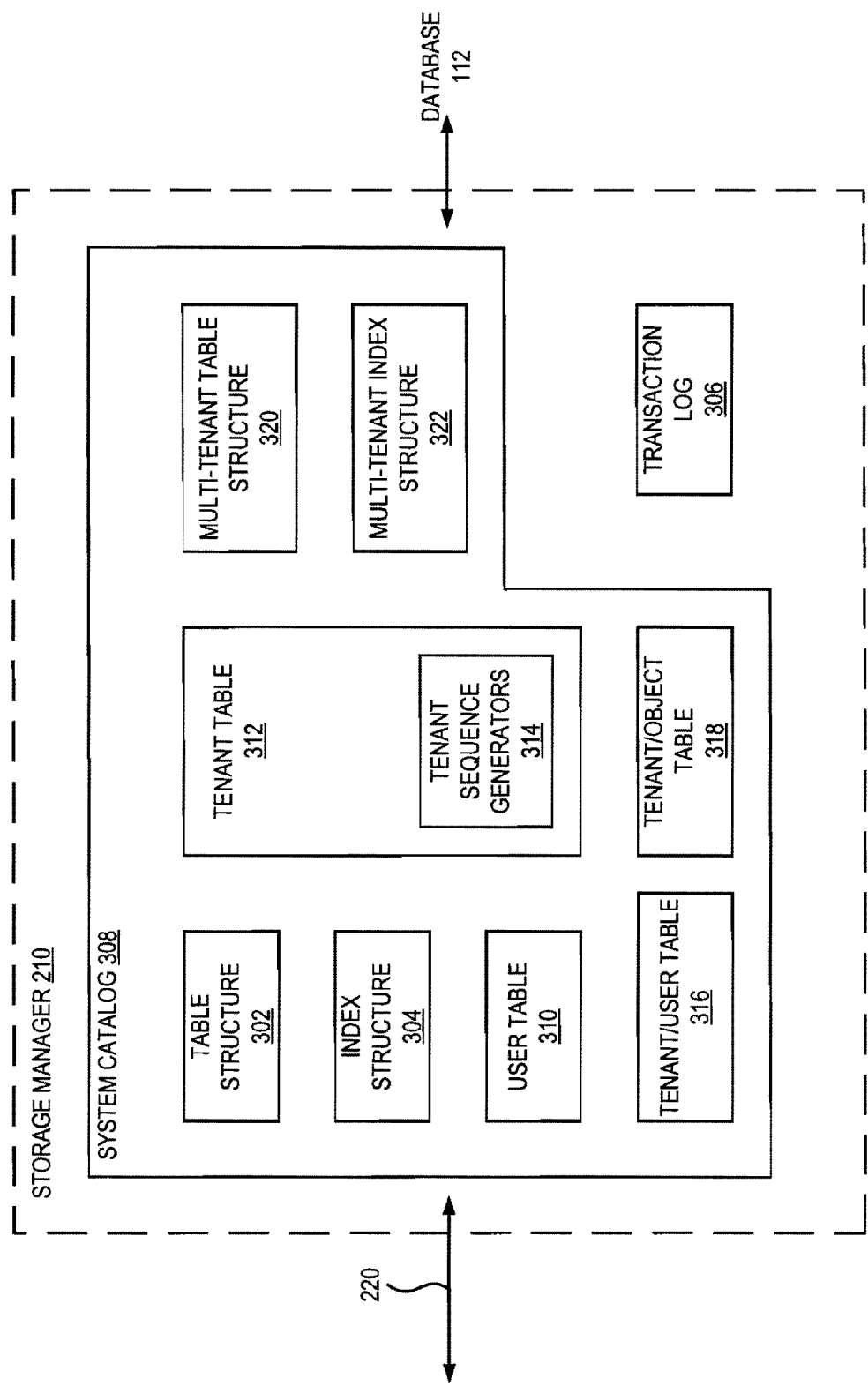
FIG. 3 is block diagram illustrating a functional view of a storage manager according to one embodiment of the present invention.

Referring now to FIG. 3, the storage manager 210 of the present invention is shown in more detail. As has been noted above, the present invention is particularly advantageous because it provides a tenant-aware RDBMS 110. This is due to the uniqueness of the storage manager 210. In one embodiment, the storage manager 210 comprises a transaction log 306 and a system catalog (sometimes called a dictionary) 308. The system catalog 308 is a set of tables that includes the metadata, which contains list of all the tables, indexes, user tables, business rules associated with the data etc. In one embodiment and as will be understood by those skilled in the art, the system catalog 308 has functionality similar to the system catalog used in OpenEdge® RDBMS 10.1 produced and sold by Progress Software Corporation of Bedford, Mass. However, the system catalog 308 also comprises a table structure 302, an index structure 304, a user table 310, a tenant table 312, a tenant/user table 316, a tenant/object table 318, a multi-tenant table structure 320 and a multi-tenant index structure 322.

Those skilled in the art will be aware that in modern database management systems, table and index data structures are arranged into multiple fixed-size units termed "blocks" or "pages". Table data consists of one or more rows and a table data page may contain one or more rows and a page header containing information describing the contents of the page. Alternately, if an individual row is longer than a single page, the row may be divided into several segments and stored on multiple related pages. Table data structures may also be arranged column-wise, such that each table data page contains column values from adjacent rows. Index data structures are often organized as b-trees (though other types of index structures may be used) and organized into index data pages containing one or more index entries and a page header containing information describing the contents of the page. The storage manager 210 manages the data associated with individual tables and individual indexes, enabling the query manager to efficiently retrieve all or part of a table's rows by using one of the available access paths. As will be better understood with reference to FIG. 3 and the description below these components allow for a tenant-aware database to allow per tenant access to tables, indices and other data. The storage manager 210 having these components is particularly advantageous because it provides a good isolation among tenants, easy updating of the schema despite the existence of multiple tenants, easy maintenance of an individual tenant's data, and good scalability and performance.

In one embodiment, the storage manager 210 is software and routines for retrieving information from and storing information to the database 112. The storage manager 210 also manages different categories of data files in the database 112. For example, the storage manager 210 manages the data files containing the relational tables. The storage manager 210 maintains the indexes associated with the tables for efficient retrieval of data. The storage manager 210 also performs other processes and methods to make the RDBMS 110 and database tenant aware. The operation of the storage manager 210 will be described below with reference to FIGS. 8-11B. In particular, the methods described below illustrate the operation of the storage manager 210 to read and write data to from the database 112 including using a multi-tenant table structure 320 and the multi-tenant index structure 322, determining the tenant of a user, and making multi-tenant schema changes.

Figure 4:
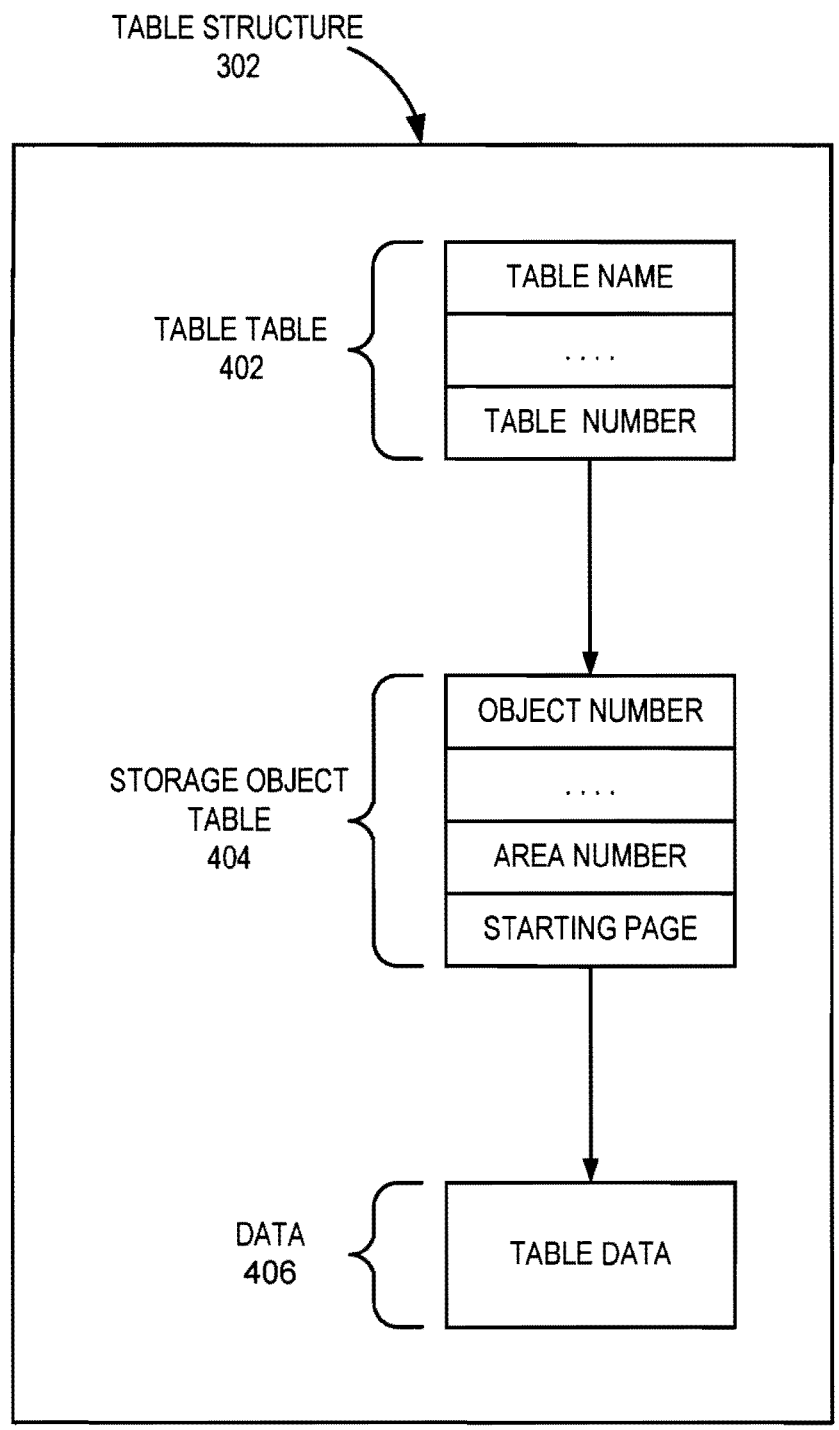
FIG. 4 is a block diagram illustrating a functional mapping of a schema definition to a storage location for a table of the prior art.

The table structure 302 is a mapping of the logical table name to the physical location for the associated table data. Typically, there will be a system catalog "table of tables" that contains descriptive and other information for each table. A storage location of each data object (tables and data for Large Object Block columns) is described in the system catalog's storage object table independent of the schema definitions for these objects. In one embodiment, this table is called the "storage object" table (not shown in FIG. 3) and is used to map from the schema's identifying numbers (e.g., a table number) to physical storage identifiers (e.g., a storage area or tablespace number and starting page location). This makes the physical storage area used for a table independent of the application and the logical schema. In the one embodiment, there is one stored instance of data for each table, so the mapping is one-to-one in the table structure 302. The table data is found by using the table number obtained from its "table of tables" catalog table row to look up the corresponding storage object table row and extract the relevant starting page location. Referring also to FIG. 4, a diagram representing an embodiment of the mapping scheme used in the table structure 302 is shown. As illustrated in FIG. 4, the table's catalog "table of tables" table row 402 defines a mapping from a table using a logical table name and a table number to a storage object table 404. In one embodiment, the storage object table 404 includes an object number, a storage area or tablespace number and starting page location to complete the mapping from the storage object table row 404 to the data 406, in this case table data.

Figure 5:
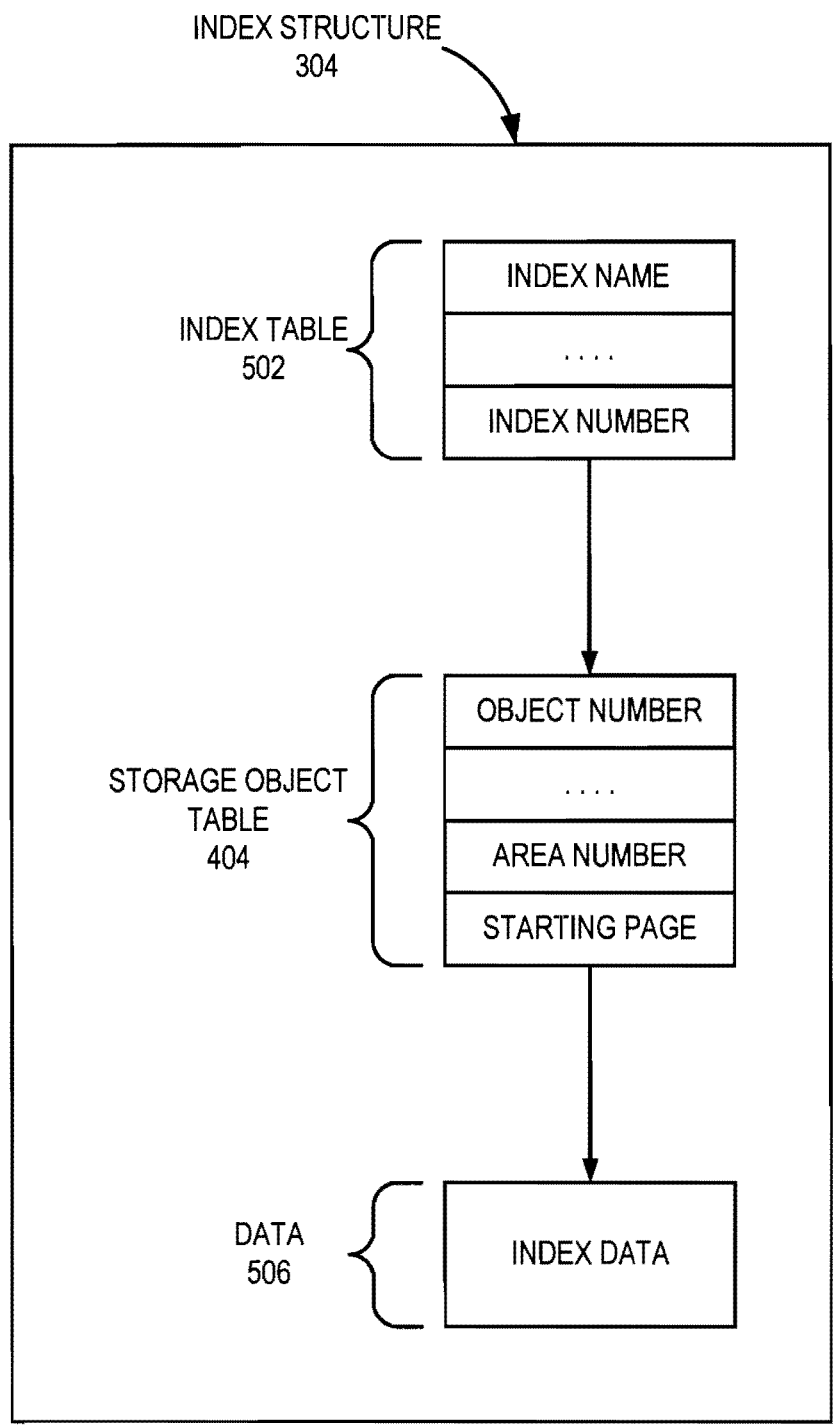
FIG. 5 is a block diagram illustrating a functional mapping of a schema definition to a storage location for an index of the prior art.

The index structure 304 is a mapping of the logical index name to the physical location for index data. As for the index structure 304, a storage location of each data object (indices) is described in a system catalog "table of indexes" table independent of the schema definitions for these objects. Again, the storage object table is used to map from the schema's identifying numbers (e.g. index number) to physical storage identifiers (e.g. a storage area or tablespace number and starting page location). This makes the physical storage area used for an index independent of the application and the logical schema. In the one embodiment, there is one stored instance of data for each index, so the mapping is one-to-one in the index structure 304. The index data is found by using the index number obtained from its "table of indexes" table row to look up the corresponding storage object row and extract the relevant starting page location. Referring also to FIG. 5, a diagram representing an embodiment of the mapping scheme used in the index structure 304 is shown. As illustrated in FIG. 5, the index structure 304 defines a mapping from an index table 502 using a logical index name and an index number to a storage object table row 404. In one embodiment, the storage object table row 404 includes an object number, a storage area or tablespace number and a starting page location to complete the mapping from the storage object table row 404 to the data 506, in this case index data. Those skilled in the art will recognize that the same reference number, 404, has been used for storage objects whether they are used for an index or a table for ease of understanding, although in actuality the storage objects may have a different data type and identifying number.

The transaction log 306 is used to access files of transactions generated by the recovery manager 208. In one embodiment and as will be understood by those skilled in the art, the log files are of a conventional type such as the log file used in OpenEdge® RDMS 10.1 produced and sold by Progress Software Corporation of Bedford, Mass.

The user table 310 is a data structure for storing information about users. In one embodiment the user table 310 includes a log in name, an identification number for the user, and other needed information such as a group of users the user is a member of, etc. In one embodiment and as will be understood by those skilled in the art, the user table 310 is of a conventional type such as the user table with the form and function of that in OpenEdge® RDMS 10.1 produced and sold by Progress Software Corporation of Bedford, Mass.

As noted above, the present invention is particularly advantageous because it provides a tenant-aware database. This functionality is in large part is provided by the tenant table 312, the tenant/user table 316, the tenant/object table 318, the multi-tenant table structure 320 and the multi-tenant index structure 322. These components, as will be described below, are used by the storage manager 210 to allow per tenant instances of table, index and Large Object Block column data. The operation and use of these components to allow multi-tenancy for SaaS will better be understood with reference to the methods described below with reference to FIG. 8 through 11B.

The tenant table 312 is a data structure for storing information about tenants. In one embodiment, the tenant table 312 includes a column for the tenant name and a column for a tenant identification number. In one embodiment, the tenant table 312 has one row for each tenant and is used to assign a unique identifier to each tenant and to hold descriptive information about each tenant. An example format for the tenant table 312 is shown below in Table 1.

TABLE 1

Tenant Table

| Column name | Data type | Description |
| --- | --- | --- |
| TenantName | character | Login name for the tenant |
| TenantId | integer | A unique integer that identifies the tenant and data objects owned by it |
| SequenceLocation | integer | Starting page or block number of the tenant's sequence generator values. |
| Description | character | Free text description of tenant. This column can be used to store whatever the application provider finds worthwhile |

Those skilled in the art will recognize that in other embodiments the tenant table 312 may have additional columns to provide additional information used for other tenant related functions and that Table 1 is only one example of many.

In one embodiment, the tenant table 312 also includes one or more sequence generators 314. In one embodiment, unlike tables and indexes, the sequence generators 314 are not mapped to the storage object table 404. The current values of sequence generators 314 are stored in a linked list of sequence value blocks. The tenant table 312 includes storage for a separate linked list of blocks for each tenant since each tenant needs its own set of sequence values. The starting block for the sequence generator 314 of each tenant may be stored in a column as shown above in Table 1.

In another embodiment, sequence generator values and other attributes of the sequence generator, such as its name, are stored in a table in the same manner as other tables as described previously.

The tenant/user table 316 is a data structure for storing information about which users are associated with which tenants. The tenant/user table 316 has one row per user and is used to identify users and associate them with a specific tenant. In one embodiment, the storage manager 210 uses the tenant/user table 316 in conjunction with the user table 310. The user name and the tenant name are used as a unique index to the data. The user name and the tenant name can also be used with other columns of the user table 310. This embodiment has the advantage of not requiring unique user names across tenants. An example format for the tenant/user table 316 is shown below in Table 2.

TABLE 2

Tenant/User table

| Column name | Data type | Description |
| --- | --- | --- |
| Name | Character | Login name for the user |
| TenantUserId | Integer | A unique integer that identifies the user |
| TenantId | Integer | The tenant id number of the tenant that owns this user |
| PasswordHash | raw SHA-1 | Hash of the user's login name, password, tenant id, and whatever else is needed. |

Those skilled in the art will recognize that in other embodiments the tenant/user table 316 may have additional columns to for additional information as needed and Table 2 is only one example of many. In another embodiment, the information stored in the tenant/user table 316 is instead stored in the user table 310.

The tenant/object table 318 is a data structure for storing information about which storage objects 404 are associated with which tenants. This tenant/object table 318 has one row for each storage object shared by multiple tenants. For each multi-tenant table 320, tenant/object table 318 includes one row per tenant. An example format for the tenant/object table 318 is shown below in Table 3.

TABLE 3

Tenant/Object Table

| Column name | Data type | Description |
| --- | --- | --- |
| TenantId | Integer | Tenant id number of the tenant that owns the data |
| ObjectNumber | Integer | The logical schema identifier for the table (table number) or index (index number) |
| StorageObjectId | integer | The identifying number of the storage object that describes and locates the tenant's data. |

Those skilled in the art will recognize that in other embodiments the tenant/user table 316 may have additional columns to for additional information as needed and Table 2 is only one example of many.

The multi-tenant table structure 320 is a mapping of the logical table name and a tenant to the physical location for table data. As with the table structure 302, a storage location of each data object (tables) is described in a table independent of the schema definitions for these objects. Again, the storage object table is used to map from the schema's identifying numbers (e.g. table number) to physical storage identifiers (e.g. a storage area or tablespace number and starting page location). This makes the physical storage area used for a table independent of the application and the logical schema. However, unlike the table structure 302, the multi-tenant table structure 320 provides a one-to-many mapping to allow per-tenant instances of table data. This is accomplished using the tenant table 312, the tenant/user table 316 and the tenant/object tables 318 described above. For example, to access a tenant's data, the storage manager 210 reads the tenant table 312 at login, caches the tenant ID value, and uses it along with the table number to find the correct storage object table row.

Figure 6:
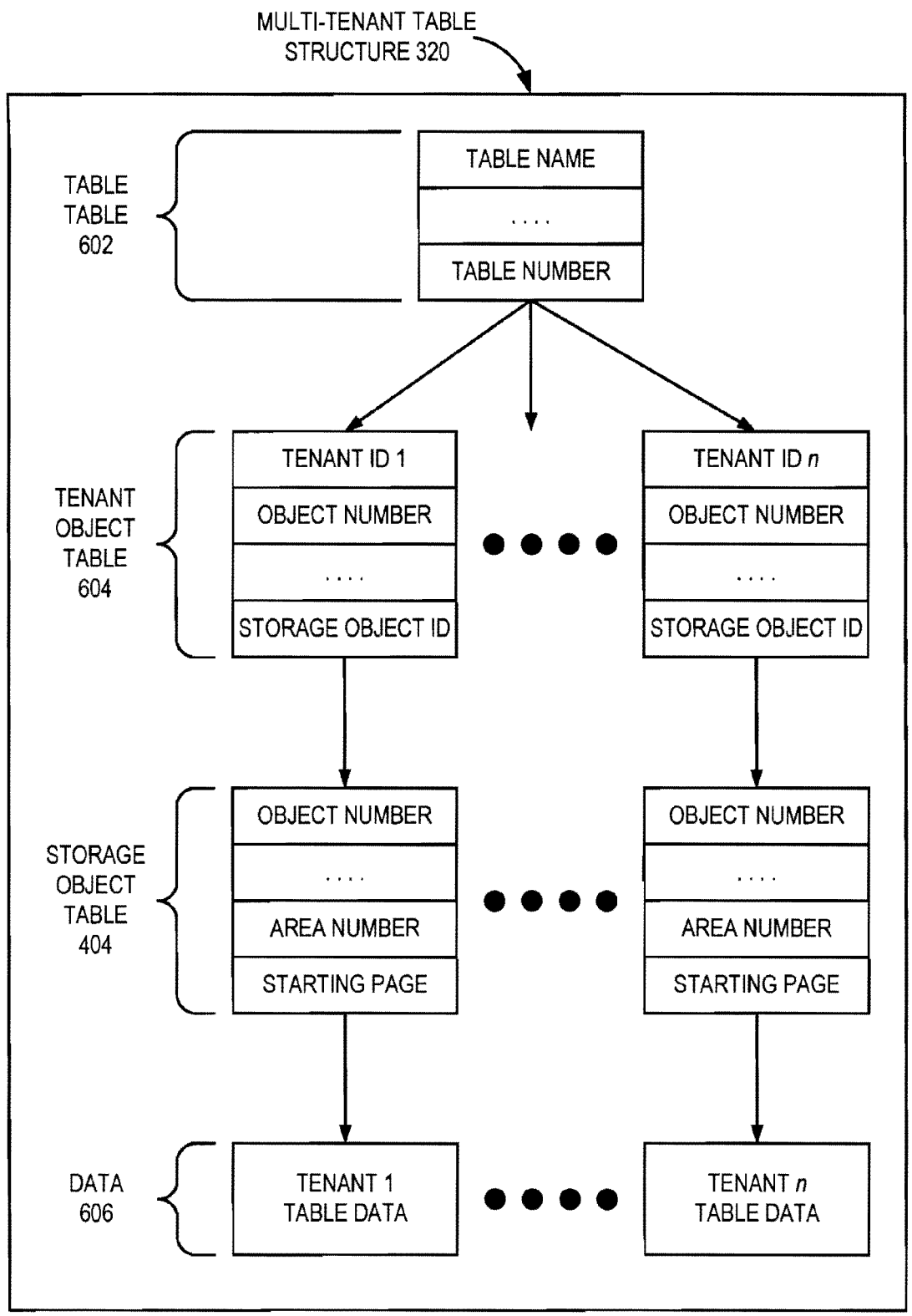
FIG. 6 is a block diagram illustrating a functional mapping of schema definitions to storage locations for a multi-tenant table structures according to one embodiment of the present invention.

Referring also to FIG. 6, a diagram representing an embodiment of the mapping scheme used in the multi-tenant table structure 320 is shown. As illustrated in FIG. 6, the multi-tenant table structure 320 defines a mapping from a "table of tables" row 602 using a logical table name and a tenant identification number. The tenant identification number is used with the table of tables row 602 to map to a tenant object table row 604. In one embodiment, the tenant object table row 604 includes a tenant identification number, an object number and a storage object ID. The tenant object table row 604 in turn references a storage object table row 404. In one embodiment, the storage object table row 404 includes an object number, a storage area or tablespace number and a starting page location to complete the mapping from the storage object 404 to the data 608, in this case table data particular to a tenant. Those skilled in the art will recognize that the same reference number has been used for storage objects 404 and they differ only in data type, such as multi-tenant table type in this case.

The multi-tenant index structure 322 is a mapping of the logical index name and a tenant to the physical location for index data. As with the multi-tenant table structure 320, the storage object table is used to map from the schema's identifying numbers (e.g. index number) to physical storage identifiers (e.g. a storage area or tablespace number and starting page location), and the multi-tenant index structure 322 provides a one-to-many mapping to allow per-tenant instances of index data. This is accomplished using the tenant table 312, the tenant/user table 316 and the tenant/object tables 318 described above. Just like the multi-tenant table structure 320, to access a tenant's index data, the storage manager 210 reads the tenant table 312 at login, caches the tenant ID value, and uses it along with the index number to find the correct storage object table row.

Figure 7:
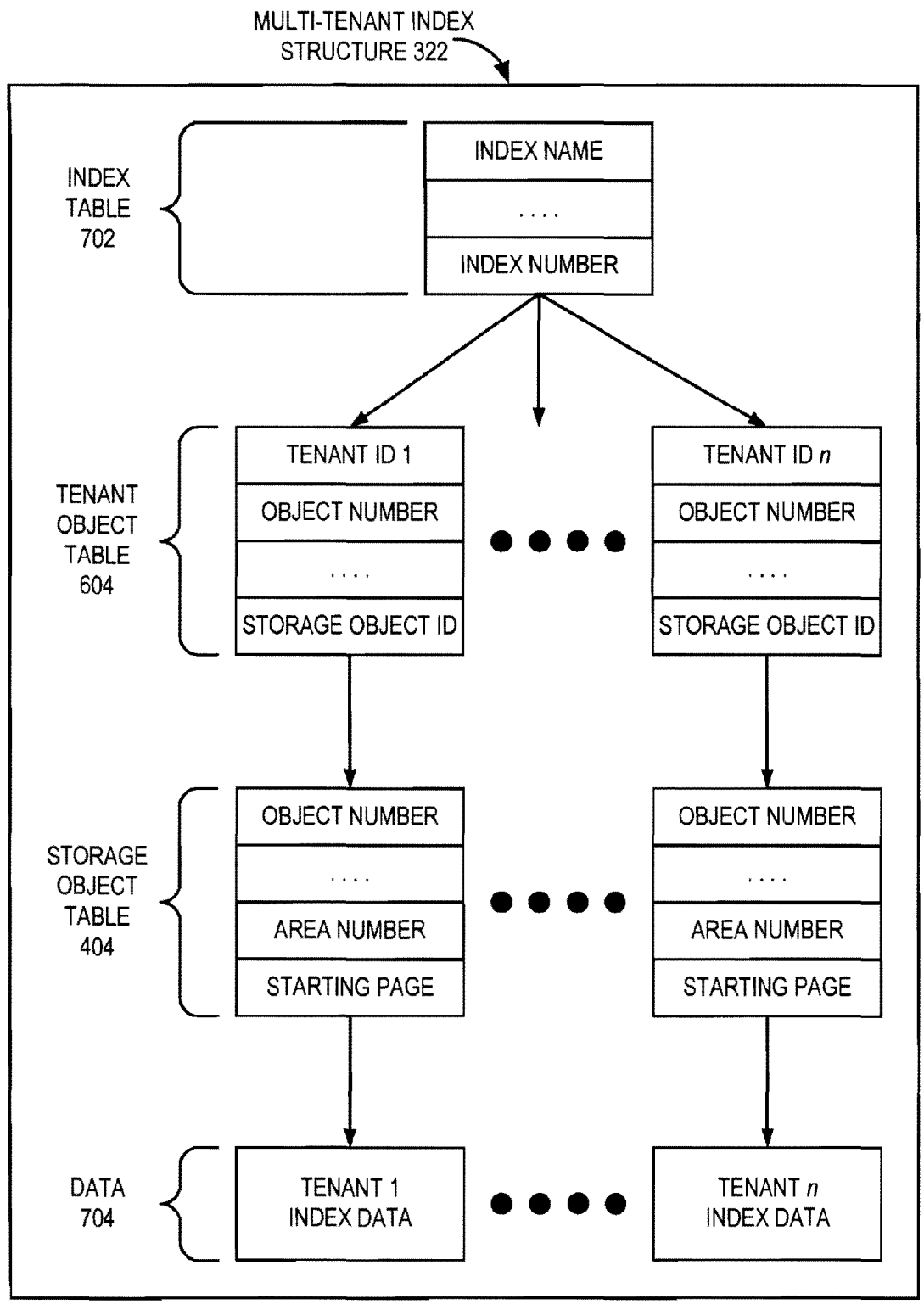
FIG. 7 is a block diagram illustrating a functional mapping of schema definitions to storage locations for a multi-tenant index structures according to one embodiment of the present invention.

FIG. 7 is a block diagram illustrating a functional mapping of schema definitions to storage locations for the multi-tenant index structure 322 according to one embodiment of the present invention. The multi-tenant index structure 322 defines a mapping from an index 702 using a logical index name and a tenant identification number. The tenant identification number is used with the table of indexes row 702 to map to a tenant object 604. The tenant object 604 in turn references a storage object table row 404 that maps to the data 704, in this case index data particular to a tenant. Those skilled in the art will recognize that the same reference number has been used for storage objects 404 and they differ only in data type, such as multi-tenant index type in this case.

The creation and use of the multi-tenant table structure 320 and the multi-tenant index structure 322 is particularly advantageous because a multi-tenant table (and its associated indexes and other information) has a single schema definition and multiple independent data instances, one for each tenant using an application. For example, in an order-processing application, one may have tables for customer, product, order, order header, and order detail information. If companies A, B, and C are tenants of the application, an application provider can have one shared definition of each of the five tables and separate data instances for each of the tenants A, B, and C. When the application starts, based on authentication information provided at login, before accessing any data, it selects the appropriate tenant's set of instance data to use for the duration of the session. To the application the database appears to be a normal database with one each of the five tables. Furthermore, the use of the multi-tenant table structure 320 and the multi-tenant index structure 322 provide good isolation among tenants data (each tenant's data can be stored in one or multiple storage areas independent of other tenants), simple schema updates as there is only one schema to update, easy maintenance for individuals tenant's data without affecting others, and good performance and scalability.

Those skilled in the art will recognize that the not all tables have to be multi-tenant. For example, a table that contains state name abbreviations can be shared by all tenants. Tables that contain billing information might be shared or multi-tenant. Those skilled in the art will recognize that the storage manager 210 may use multi-tenant tables only or a combination of multi-tenant tables and conventional tables.

In the one embodiment, the tenant table data 608 and the tenant index data 704 are stored in encrypted format. Each tenant's table data is stored in an encrypted format using a different key. For example, the tenant 1 table data is only accessible by tenant 1 using its encryption/decryption key, key 1, while the tenant 2 table data is only accessible by tenant 2 using a different encryption/decryption key, key 2, and so on for each tenant to tenant n. Thus, even if tenant 2 accesses the data of another tenant, tenant 1, it is encrypted and therefore not decryptable by the tenant 2 since tenant 2 does not have the key for the data. This provides an additional level of this isolation of one tenant's data from other tenants.

Methods

Figure 8:
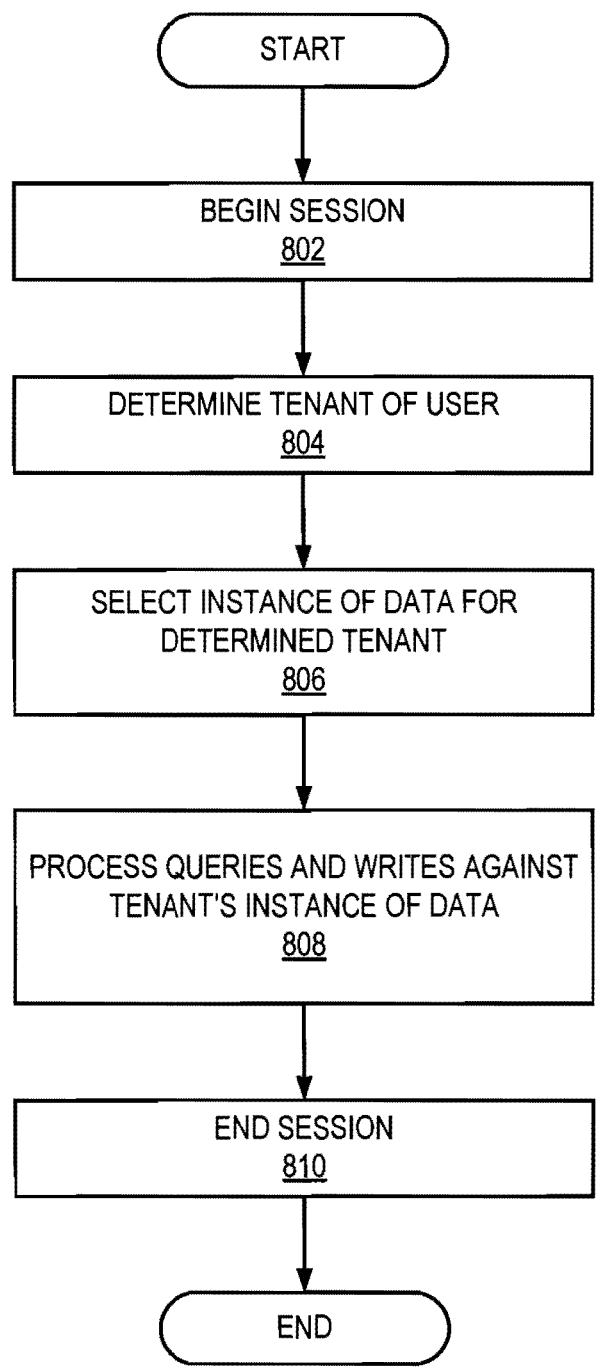
FIG. 8 is a flowchart illustrating a process for reading or writing using the storage manager according to one embodiment of the present invention.

Referring now to FIG. 8, an embodiment of a general process for reading or writing using the storage manager 210 having the multi-tenant table structure 320 and the multi-tenant index structure 322 according to one embodiment of the present invention will be described. The method starts with the user beginning 802 a session with the RDBMS 110. As part of beginning 802 the session, the user is identified by the storage manager 210 using user table 310 and login information. One embodiment of this process will be described in more detail below with reference to FIG. 10. Next the storage manager 210 determines 804 the tenant of the user. For example, the tenant may be determined by accessing tenant/user table 316. Next, the method selects 806 instances of data for the tenant determined in step 804. Once the instances of data for the determined tenant have been selected 806, the storage manager 210 can process 808 any number of queries and/or writes against the tenant's instance of data. One embodiment of this process will be described in more detail below with reference to FIG. 9. Finally, the general method is completed with the user ending 810 the session.

Figure 9:
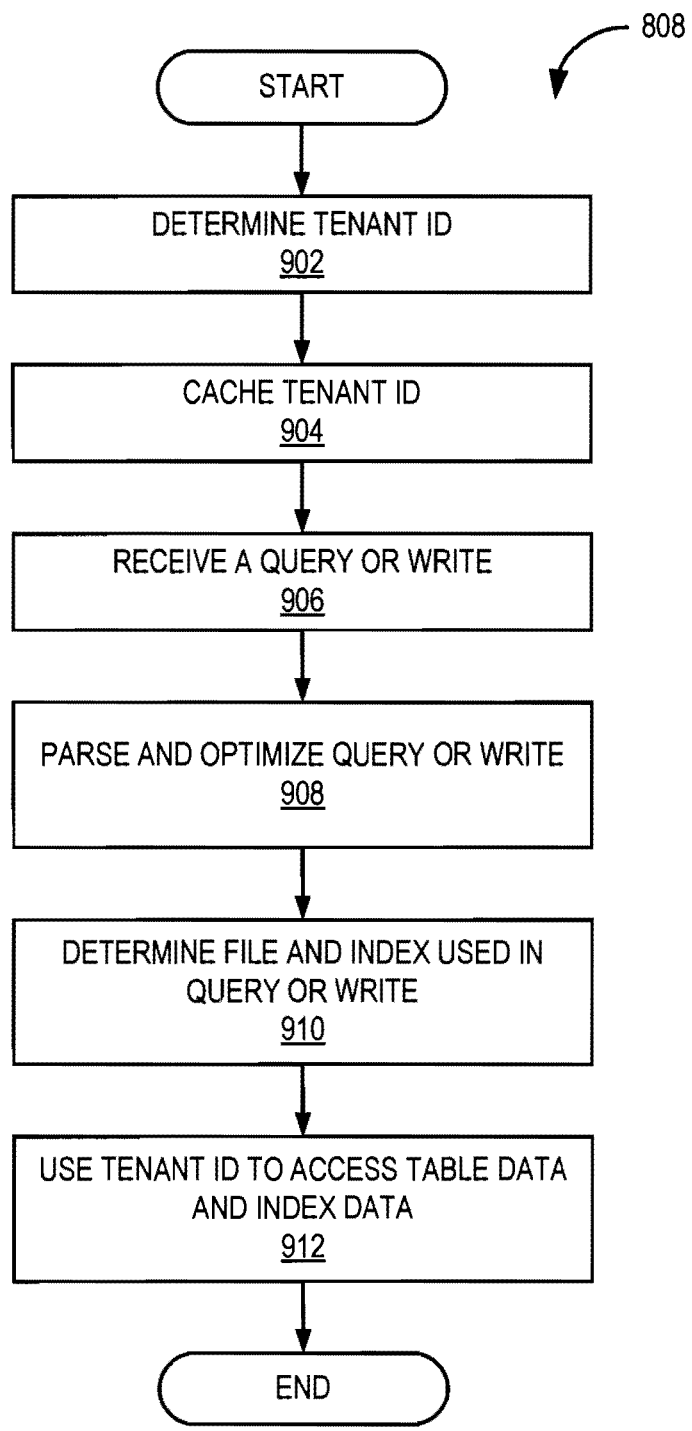
FIG. 9 is a flowchart illustrating a process for reading or writing using the multi-tenant table structure and the multi-tenant index structure according to one embodiment of the present invention.

Referring now to FIG. 9, one embodiment of reading or writing using the tenant-aware RDBMS 110 according to the present invention will be described. The process for reading or writing using a tenant-aware storage manager 210 begins by determining 902 a tenant identification number corresponding to the user. One embodiment of this process is described in more detail below with reference to FIG. 10. Once a tenant identification number has been determined 902, it is stored 904 in cache memory for fast access by the RDBMS 110. Next, the RDBMS 110 receives 906 a query command or a write command. The query engine 202 parses and optimizes 908 the query or write command. Next, the storage manager 210 determines 910 the table and index used in the query or write operation. Finally, the method uses the tenant identification number that has been stored in cache along with determined table and index from step 910 to access 912 the table data and the index data. For example, the storage manager 210 accesses the multi-tenant table structure 320 and the multi-tenant index structure 322, and uses the tenant identification number, table names and index names to determine the physical location of the table data and the index data.

Figure 10:
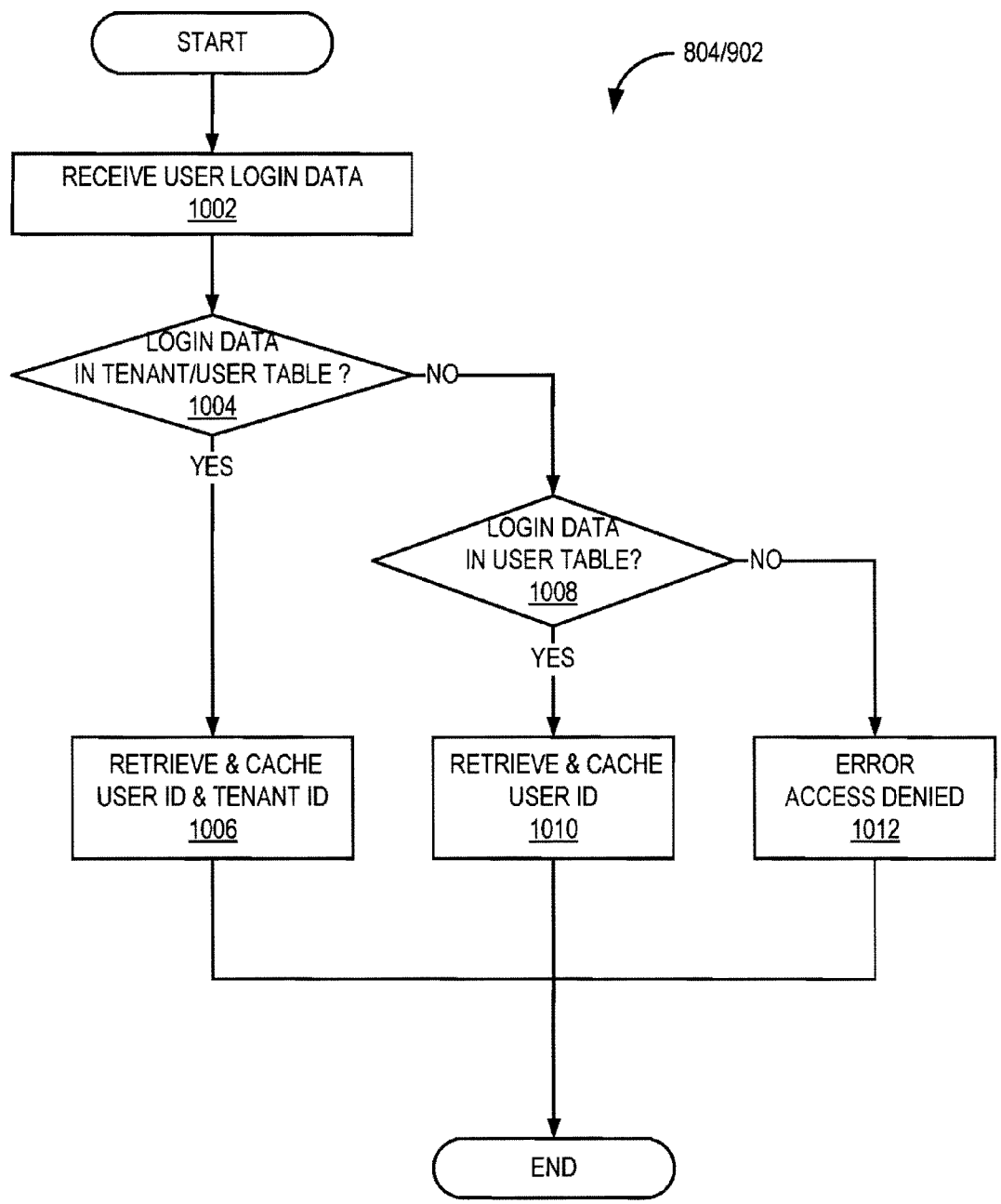
FIG. 10 is a flowchart illustrating a process for determining the tenant of a user according to one embodiment of the present invention.

Referring now to FIG. 10, one embodiment of a process for determining the tenant of a user is shown. The method begins by receiving 1002 user login data. Then the method accesses the tenant/user table 316 to determine 1004 whether the tenant/user table 316 has an entry corresponding to the received user login data. For example, the storage manager 210 can search the "name" column for a match. If the tenant/user table 316 has a corresponding entry, the method continues to retrieve 1006 the tenant identification number and the user identification number from the tenant/user table 316 and then stores 1006 the user identification number and the tenant identification number in the cache of the storage manager 210 after which the login method for multi-tenancy is complete. It should be noted that in this embodiment the user need only input a login name and password. The user need not input a tenant name. The storage manager 210 uses the tenant/user table 316 to determine both the user name and the tenant name as both are required as a unique index to the data. This makes tenant named transparent to the users.

On the other hand, if there is not an entry in the tenant/user table 316 corresponding to the received user login data, the process continues to determine 1008 whether there is an entry corresponding to the received user login data in the user table 310. If so, the method continues to retrieve 1010 the user identification number and store 1010 the user identification number in the cache of the storage manager 210, and the method is completes. If there is not an entry in the user table 310 corresponding to the received user login data, the method completes by sending 1012 an error message and denying access to the RDBMS 110.

Figure 11A:
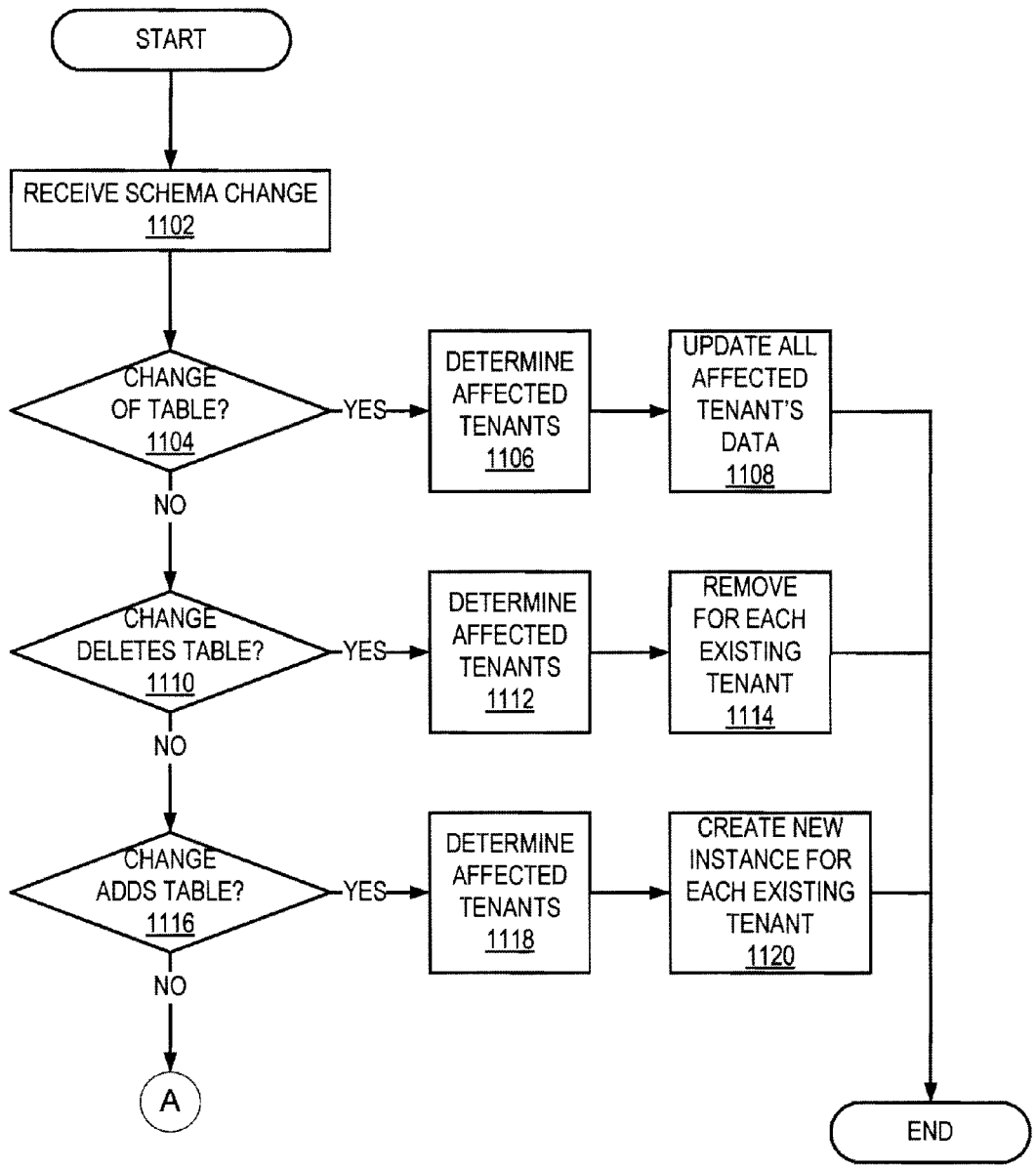
FIGS. 11A and 11B are a flowchart illustrating a process for making multi-tenant schema changes according to one embodiment of the present invention.
Figure 11B:
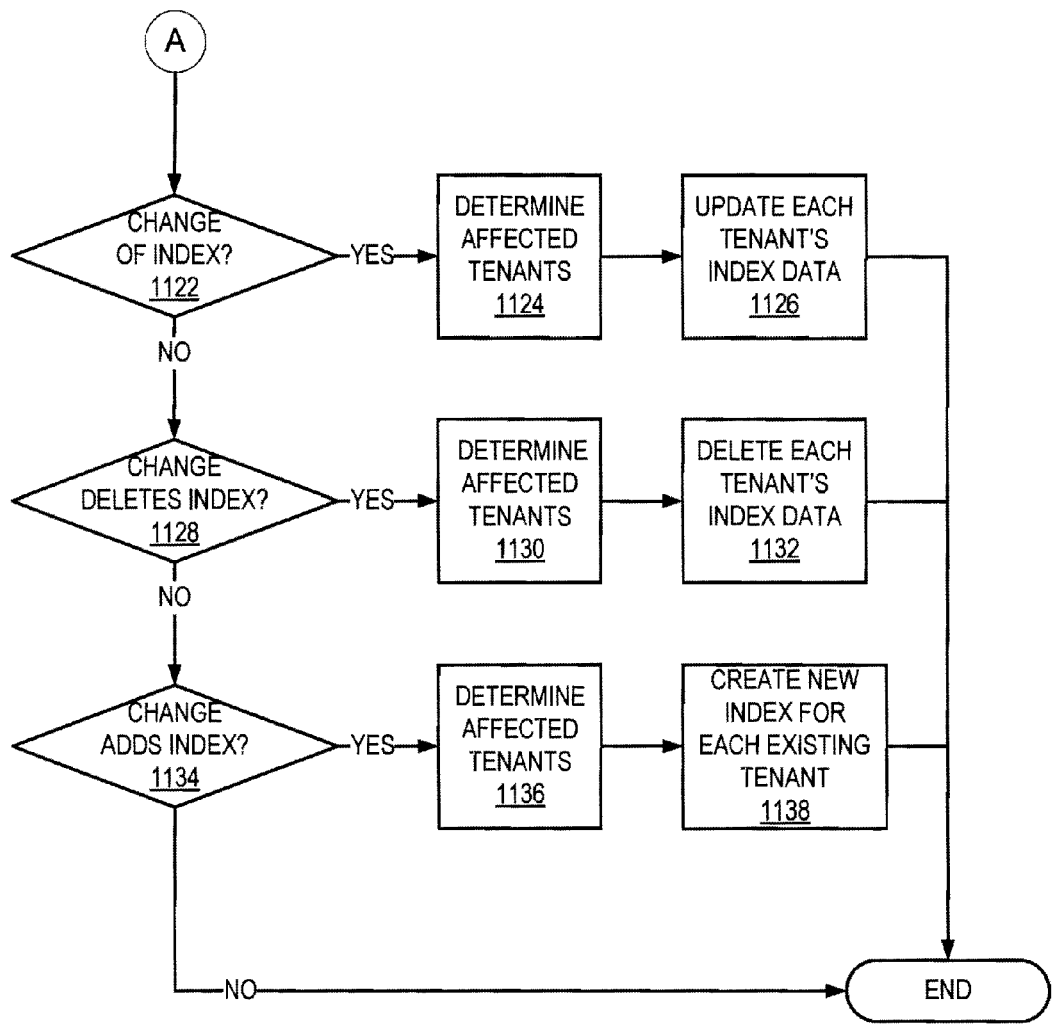

Referring now to FIGS. 11A and 11B, one embodiment of the process for making multi-tenant schema changes according the present invention is described. The process begins as shown in FIG. 11A when the storage manager 210 receives 1102 a schema change. In general, the method determines a type of schema change (e.g., table or index change, addition or deletion), determines the one or more tenants affected by the schema change; and then implement the schema change for the table or index data on a tenant basis. This is advantageous because it greatly simplifies the administration of the database on a tenant basis.

The method next determines 1104 whether the received schema change is a request to change a table. If so, the storage manager 210 determines 1106 the one or more tenants affected by the table change. The storage manager 210 uses the tenant object of the multi-tenant table structure 320 and the table identified in the schema change to determine the tenants affected by the request change table. For example, a tenant identification number can be determined from the tenant object and the file name in the schema change. Then the method updates 1108 all the tenant's data affected by the change in the table, and method is complete and ends.

If in step 1104, the received schema change was not a request to change table, the method continues to determine 1110 whether the received schema change deletes a table. If the received schema change deletes a table, the method continues by determining 1112 the tenants that would be affected by the deletion of the table identified in the schema change. Since each tenant may have its own instance of a particular table, a schema change that deletes a table affect all the tenants. In step 1112, the storage manager 210 determines which tenants have an instance of the table that will be deleted. The storage manager 210 then removes 1114 the table identified in the schema change for each existing tenant. In one embodiment, the storage manager 210 removes the table by accessing and changing the tenant table data for each tenant using the multi-tenant table structure 320. After step 1114 the method is complete and ends.

If in step 1110, the received schema change was not to delete a table, the method continues to determine 1116 whether the received schema change is to add a table. If it is determined 1116 that the schema change is to add a table, the process continues by determining 1118 the tenants affected by the addition of a table. Like the deletion of the table, a schema change that adds a table is affects all the tenants. Next the method creates 1120 a new instance of the table identified in the schema change for each existing tenant. In one embodiment, the storage manager 210 adds the new table instances by accessing and changing the tenant table data for each tenant using the multi-tenant table structure 320. After step 1120 the method is complete and ends.

Referring now also to FIG. 11B, the method transitions from step 1116 to 1122. If in step 1116, the received schema change was not to add a table, the method continues to determine 1122 whether the received schema change is to change an index. If so, the storage manager 210 determines 1124 the tenants affected by the index change. The storage manager 210 uses the tenant object of the multi-tenant index structure 322 and the indexidentified in the schema change to determine the tenants affected by the requested index change. Then the method updates 1108 each tenant's index data for each tenant determined to be affected by the change in the index, and method is complete and ends.

If in step 1122, the received schema change was not to change an index, the method continues to determine 1128 whether the received schema change is to delete an index. If so, the method next determines 1130 the tenants that are affected by the deletion of the index. Then for each of these tenants identified in step 1130, the method deletes 1132 the index data for those tenants. For example, the multi-tenant index structure 322 is used to access each tenant's index data and delete the index identified in the received schema change. After step 1132, the method is complete and ends.

If in step 1128, the received schema change was not to delete an index, the method continues to determine 1134 whether the received schema change is to add an index. If so, the method determines 1136 the tenants that are affected by the addition of an index. For each of these tenants, the storage manager 210 creates 1138 a new index. In one embodiment, the storage manager 210 accesses the index data 704 of each tenant when using the multi-tenant index structure 322 and adds a new index as prescribed by the received schema change. After step 1138, the method is complete and ends.

While the type of schema change has been evaluated in a particular order in FIGS. 11A and 11B, those skilled in the art will recognize that the steps may be performed in various other orders without departing from teachings of the present invention.

Another particularly advantageous feature of the present invention is that the multi-tenant table structure 320 and the multi-tenant index structure 322 can be used as a mechanism by the storage manager 210 to control the amount of resources consumed by each tenant. For example, a storage manager 210 (e.g., its buffer manager and the query executor) can use the multi-tenant table structure 320 and the multi-tenant index structure 322 to ensure that a particular tenant does not consume all the resources of the storage manager 210 at the expense of other tenants. The resources allocated to a tenant can be stored in the tenant table 312 and during operation those values can be cached in memory. In one embodiment, the percentage of total CPU time consumed by one tenant can be limited to a specified maximum unless there is unused CPU time. Such a limitation would be enforced by a query executor (not shown) that is part of the RDBMS 110. In another embodiment, the percentage of database page buffers used by one tenant can be limited to a specified maximum. This type of limitation would be enforced by a buffer manager (not shown) of the storage manager 210. In other words, the buffer manager would limit the number of buffers used on a per tenant basis. In yet another embodiment, different tenants could be assigned different relative priorities for either buffer space or CPU time or both. The ability to control the amount of resources consumed by each tenant is particularly advantageous for SaaS models where tenants or customers of the application service provider purchase those services based on the number of transactions or other operations executed. These structures can provide a guarantee that the tenants do not consume more resources than those for which they paid. Furthermore, controlling the maximum amount of resources allocated for each tenant is advantageous because it allows the application service provider to guarantee a quality of service yet optimize the use of its computing resources by knowing and being able to enforce the limit for each tenant.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A storage system comprising:
    one or more processors; and
    a memory storing instructions that, when executed by the one or more processors, cause the system to:
        receive a command and data associated with a first tenant;
        access a tenant table having a tenant name and a tenant identification number for a plurality of tenants including a tenant name and tenant identification number for a first tenant and a tenant name and tenant identification for a second tenant to retrieve a first identification for the first tenant; and
        map, using a multi-tenant structure, a logical data structure identifier to one or more physical location identifiers associated with one or more physical locations in a relational database associated with a first data instance and the data associated with the received command, the one or more physical locations independent of a logical schema, the relational database having a logical schema definition shared by the first tenant and the second tenant, the first data instance associated with the first tenant and a second data instance associated with the second tenant; and
        receive a schema change, determine a set of affected tenants using the multi-tenant structure and implement the schema change to the set of affected tenants.

2. The storage system of claim 1, wherein the instructions, when executed by the one or more processors, further cause the system to map, using the multi-tenant structure, one from the group of table data and index data.

3. The storage system of claim 1, wherein the instructions, when executed by the one or more processors, further cause the system to map, using the multi-tenant structure, table data and to map, using a second multi-tenant structure, a logical name to a physical location in the database, the second multi-tenant structure mapping index data.

4. The storage system of claim 1, wherein the tenant table stores at least one sequence generator for at least one tenant.

5. The storage system of claim 1, wherein the instructions, when executed by the one or more processors, further cause the system to associate the first tenant with one or more sequence generator values and wherein the tenant table stores one or more of a starting page and a starting block for the first tenant's one or more sequence generator values.

6. The storage system of claim 1 comprising a tenant/user table for specifying which users are associated with which tenants, the tenant/user table including a user name, a user identification number and a tenant identification number, for at least one of the plurality of tenants.

7. The storage system of claim 6, wherein the storage system uses a user name and a tenant name as a unique index to the data.

8. The storage system of claim 1 comprising a tenant/object table for storing information about a storage object associated with one of the plurality of tenants.

9. The storage system of claim 8, wherein the tenant/object table include a tenant identification number, an object number, and a storage object identification number for a plurality of tenant objects.

10. The storage system of claim 1, comprising a storage object table for mapping between a tenant object and a physical storage location.

11. The storage system of claim 10, wherein the instructions, when executed by the one or more processors, further cause the system to map from the schema's identifying numbers (e.g. index number) to physical storage identifiers using the storage object table.

12. The storage system of claim 1, wherein the multi-tenant structure includes a multi-tenant table having a single schema and multiple independent instances corresponding to the multiple tenants.

13. The storage system of claim 1, wherein the instructions, when executed by the one or more processors, further cause the system to a select an instance for a particular tenant based on received authentication information using the multi-tenant structure.

14. The storage system of claim 1 including a non-multi-tenant table associated with a particular tenant and unshared with other tenants.

15. The storage system of claim 1, wherein the schema change is implemented on a tenant basis.

16. The storage system of claim 1, wherein the schema change includes one or more of a change of table, a deletion of a table and an addition of a table.

17. The storage system of claim 1, wherein the schema change includes one or more of a change of index, a deletion of an index and an addition of an index.

18. The storage system of claim 1, wherein the storage system uses the multi-tenant structure to control utilization of one or more resources by the plurality of tenants on a per tenant basis.

19. The storage system of claim 18, wherein the one or more resources includes at least one of a number of buffers, percentage of buffer space, priority for buffer space, priority for central processing unit (CPU) time and percentage of total CPU time.

20. The storage system of claim 1, wherein the instructions, when executed by the one or more processors, determine one or more tenants affected by a schema change by using a tenant object of the multi-tenant structure and a table identified in the schema change and modify a table or index for the one or more affected tenants.

* * * * *